United States Patent [19]

Hartung

[11] Patent Number: 5,457,495
[45] Date of Patent: Oct. 10, 1995

[54] ADAPTIVE VIDEO CODER WITH DYNAMIC BIT ALLOCATION

[75] Inventor: John Hartung, Warren, N.J.

[73] Assignee: AT&T IPM Corp., Coral Gables, Fla.

[21] Appl. No.: 248,982

[22] Filed: May 25, 1994

[51] Int. Cl.⁶ .................................................. H04N 7/50
[52] U.S. Cl. .......................... 348/414; 348/417; 348/418; 348/15; 348/14
[58] Field of Search ..................... 348/400, 401, 348/414, 417, 418, 422, 14, 15; H04N 7/133, 7/137

[56] References Cited

U.S. PATENT DOCUMENTS

| | | | |
|---|---|---|---|
| 5,128,756 | 7/1992 | Johnston | 348/418 |
| 5,172,228 | 12/1992 | Israelsen | 348/422 |
| 5,194,864 | 3/1993 | Nakano | 348/422 |
| 5,398,069 | 3/1995 | Huang | 348/418 |

Primary Examiner—Howard W. Britton
Attorney, Agent, or Firm—Kenneth M. Brown

[57] ABSTRACT

A method of coding a video signal at a fixed bit rate with use of a vector quantization codebook, wherein advantageous codebook updates are determined by comparing a coding error associated with a first provisional coding of a frame with a coding error associated with a second provisional coding of the frame. The first provisional coding uses a fixed available number of bits to code a frame with use of the unmodified codebook, whereas the second provisional coding uses a modified codebook to code the same frame. However, the second provisional coding codes both the frame and the codebook updates with the fixed available number of bits. The provisional coding having the smaller coding error is selected as the coding of the frame which will be adopted. In addition, the codebook may be replaced with the modified codebook when the second provisional coding is selected. In this manner, the coder will adapt the codebook to the characteristics of the scene.

34 Claims, 2 Drawing Sheets

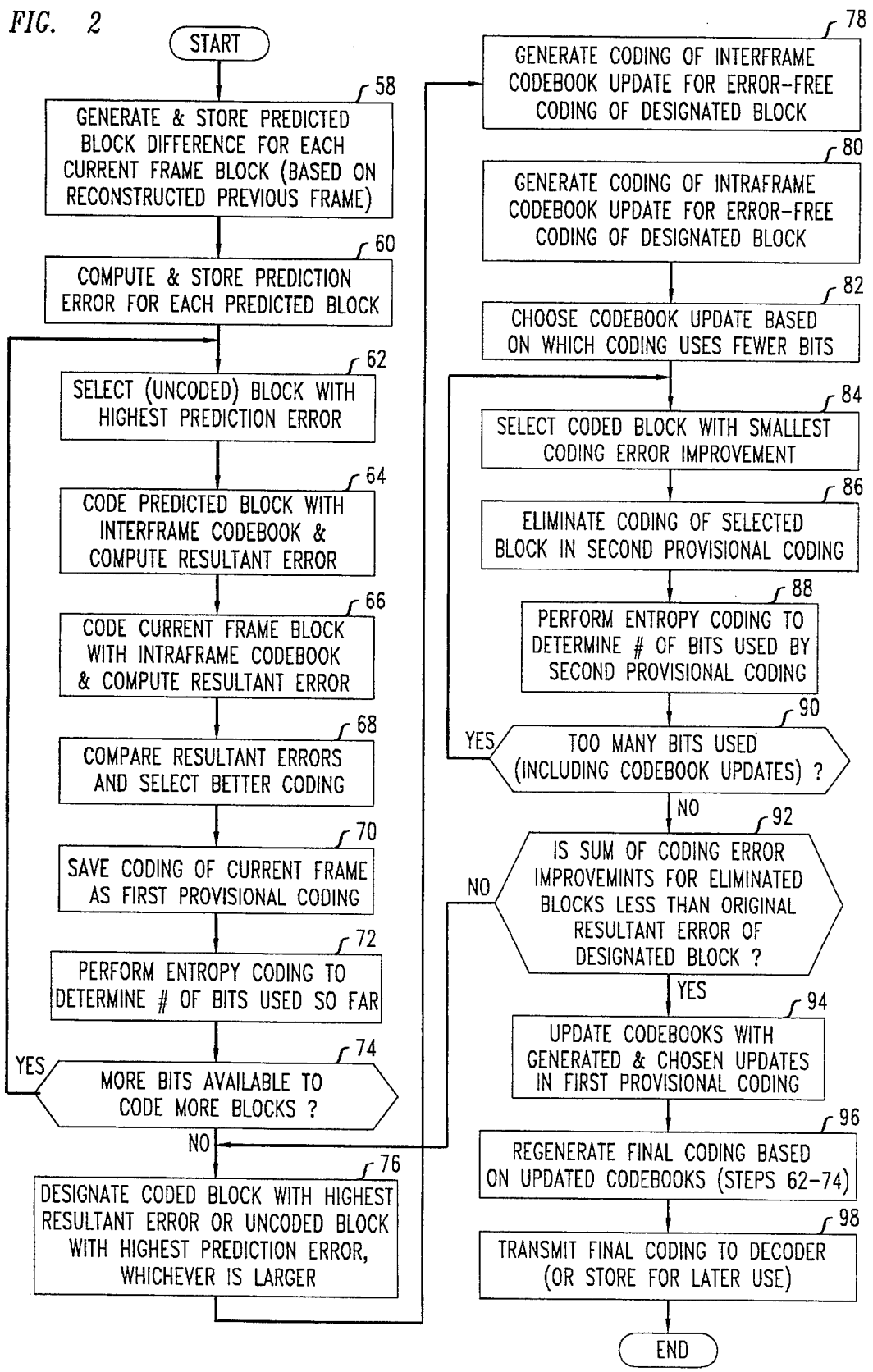

ADAPTIVE VIDEO CODER WITH DYNAMIC BIT ALLOCATION

FIELD OF THE INVENTION

The present invention relates generally to the field of video signal coding and more particularly to the coding of video signals for use in video communications at low bit rates.

BACKGROUND OF THE INVENTION

The coding of video signals for efficient transmission and/or storage has received a great deal of recent attention, particularly with the growing interest in technologies such as HDTV (High Definition Television) and Interactive Television (e.g., "video-on-demand"). In fact, video coding algorithms have been standardized for many of these applications (e.g., Motion Picture Experts Group standards such as MPEG-1 and MPEG-2). These applications, however, typically involve the coding of video signals at coding rates above 56 kbits/s (kilobits per second).

The techniques used in these applications most commonly code each video frame (i.e., each individual still image) at a variable bit rate and then use buffering to obtain a fixed data rate for transmission or storage. Coded frames may be dropped (i.e., the previous frame is repeated on decoding) if the average rate over successive frames would cause the buffer to overflow. The result is that the decoded video has an effectively variable frame rate and a delay (in addition to the transmission delay) due to the buffer.

In video communications applications (e.g., video telephones) the available bandwith (i.e., maximum bit rate) may be substantially less than that which is available in other applications. If the coded video signal is intended for transmission across a conventional telephone line with the use of a conventional modem, bit rates may well be limited to 19.2 kbits/s or even to 9.6 kbits/s based on current modem technology. However, when the above-described techniques are used at bit rates much lower than 56 kbits/s the resultant decoded video is often unacceptable. For example, since the buffer delay is proportional to the inverse of the maximum coded frame rate, and since the coded frame rate is often reduced in order to achieve the lower coding bit rates, unacceptable delay may be introduced. In addition, the reduced coding rate requires more frequent frame repeats, and thus results in an unacceptably low average frame rate. To overcome these problems, it would be advantageous to encode each frame at a constant bit rate, thereby eliminating the need for buffering, avoiding the associated delay and maintaining a constant frame rate in the resultant decoded video. However, like their variable bit-rate counterparts, conventional fixed bit-rate video coding techniques have not been able to achieve acceptable quality levels at these low bit rates.

A common approach to video signal coding involves the use of vector quantization codebooks. The general principles of vector quantization and the use of vector quantization codebooks are described in detail in A. Gersho and R. M. Gray, *Vector Quantization and Signal Compression*, Kluwer Academic Publishers, Boston Mass., 1992. In such an approach, each frame is typically divided into frame portions referred to as "vectors" or "blocks." Each of these blocks contains the signal data for a plurality of pixels (individual picture elements). Depending, for example, on the available bit rate, some or all of these blocks are then quantized and compared with entries in a codebook to find the best match. The index of the best matching codebook entry is then transmitted to the decoder which contains an identical codebook. Thus, the codebook entry index is used to represent the given block. This form of coding, in which the pixels of a given frame are coded irrespective of the content of other frames, is known as "intraframe" coding.

Most often, the blocks to be coded are transformed into a frequency domain (e.g., with use of a Discrete Cosine Transformation) before quantization, and a corresponding inverse transformation is performed by the decoder. Thus, the codebook entries are frequency domain entries. In addition, the coder may use "interframe" coding techniques, in addition to the previously described intraframe coding technique, when it is advantageous to do so. In interframe coding, each block to be coded (or, more commonly, its transform) is compared with a corresponding block of pixels (or its transform) from a previous frame, and the difference between the two is quantized and matched against an "interframe" codebook containing difference entries. Moreover, the pixels from the previous frame may be "motion compensated" in order to produced a better match (i.e., a smaller difference from the block to be coded). That is, portions of the previous frame are relocated within the image and compared to the current frame to determine "motion vectors" which represent the movement in the scene.

Typically, when performing interframe coding, it is advantageous to incorporate the decoder circuitry within the encoder to "reconstruct" the previous frame data. In this manner, the difference analysis performed by the encoder will advantageously be based on the decoded previous frame (since the decoding of the current frame in the decoder will also be so based), resulting in a more accurate coding of the present frame.

One particular approach which has been taken in certain signal coding techniques involves the use of adaptive codebooks, which are described in Chapter 11 of Gersho and Gray. Adaptive codebooks change over time in an attempt to provide a better match to the local statistics of the signal being coded. That is, the codebook, and thereby the coder, adapts to the characteristics of the signal. In a video application, such an approach can result in an improved quality of the decoded video, since the coder is, in effect, adapting itself to the given scene (i.e., the particular objects and motion contained therein).

Forward adaptive codebook schemes use information from the frame to be coded to modify and, hopefully, thereby improve, the codebook. Such techniques typically replace one or more of the codebook entries with new entries before coding the current frame. Blocks which might otherwise not be coded well (i.e., with a sufficiently small error) might form the basis of a new codebook entry, thereby, e.g., resulting in an improved or even error-free coding of the given block. However, since the decoder must be supplied with the codebook update, additional information, known as "side" information, has to be separately coded and transmitted by these forward adaptive techniques, so that the current frame can be properly decoded by the decoder. Therefore, despite their ability to adapt the coder to the scene when used in video applications, the use of these forward adaptive schemes has heretofore been inconsistent with the use of fixed bit-rate coding.

SUMMARY OF THE INVENTION

The present invention recognizes the fact that a fixed bit-rate video coding technique employing a mechanism for adapting the coding of successive frames to the scene being coded can maintain a constant frame rate and acceptable quality at low bit rates. In order to employ a forward adaptive codebook scheme while coding each frame with a fixed number of bits, an illustrative embodiment of the present invention performs a tradeoff analysis between the coding of codebook updates and the coding of the blocks the given frame. When it is advantageous to do so (i.e., when the overall coding quality is improved), a codebook update is coded by using the necessary number of bits, and one or more blocks of the frame which could otherwise have been coded with use of those bits are not coded.

Specifically, the principles of the invention are embodied in a method of coding a signal with use of a vector quantization codebook, wherein advantageous codebook updates are determined by comparing a coding error associated with a first provisional coding of a frame with a coding error associated with a second provisional coding of the frame. The first provisional coding uses the fixed available number of bits to code the frame with use of the unmodified codebook, whereas the second provisional coding uses a modified (i.e., updated) codebook to code the same frame. However, the second provisional coding codes both the frame and the codebook updates with the fixed available number of bits. The provisional coding having the smaller coding error is selected as the coding of the frame which will be adopted. In addition, the codebook may be replaced with the modified codebook when the second provisional coding is so selected. In this manner, the coder will adapt the codebook to the characteristics of the scene.

BRIEF DESCRIPTION OF THE DRAWINGS

FIG. 2 shows a flow diagram of a method of coding a video signal in accordance with an illustrative embodiment of the present invention.

DETAILED DESCRIPTION

Figure 1:
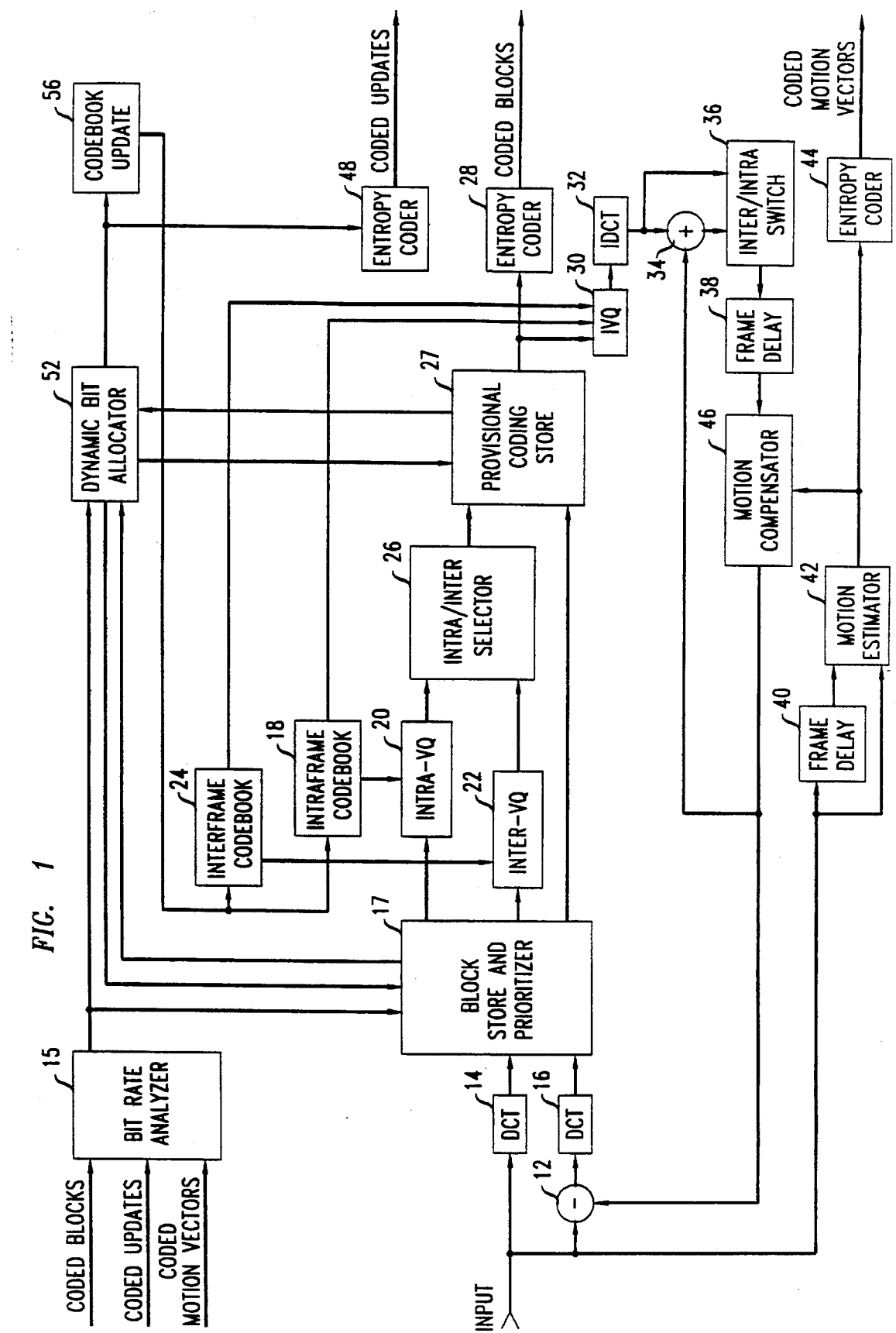
FIG. 1 shows a block diagram of a video coder in accordance with an illustrative embodiment of the present invention.

FIG. 1 shows a block diagram of a video coding system which operates in accordance with an illustrative embodiment of the present invention. The video coder of FIG. 1 is illustratively part of a video conferencing system or a video telephone (i.e., a videophone). In either of these cases, the coder input signal shown in FIG. 1 ("Input") may be supplied by a conventional video camera (not shown) together with associated interfacing circuitry such as a conventional analog-to-digital converter (also not shown). In addition, the coder outputs ("Coded Updates," "Coded Blocks" and "Coded Motion Vectors") may illustratively be combined and transmitted to the intended receiver by conventional transmission means such as, for example, a modem (also not shown). Moreover, a means for receiving a received coded video signal (e.g., a receiving modem), a corresponding decoder for decoding the received video signal, and a video display for displaying the decoded signal may also be included to provide for two-way video communications. All of the above components which may operate in conjunction with the illustrated video coding system of FIG. 1 are omitted from the drawing since they are all conventional components of conventional design.

The illustrative video coding system of FIG. 1 performs dynamic bit allocation of the available bandwidth in order to select an "optimal" coding of a given frame, and updates its codebooks in accordance therewith for use in the coding of subsequent frames. Identical codebooks are maintained at the encoder and decoder and are adjusted to minimize the distortion (i.e., error) in each successive frame. Thus, codebook updates are coded for subsequent transmission to the decoder in addition to the coding of the block data and motion vectors for the given frame. Since the VQ (vector quantized) codebooks adapt continuously (i.e., on a frame by frame basis), vectors which provide good representations of the objects and motion in the scene are retained.

The illustrative system of FIG. 1 can be advantageously used to code motion video at low bit rates, such as, for example, in the range of 8 to 40 kbits/s. The coder maintains constant frame and bit rates, thereby providing smooth motion and audio/video synchronization ("lip synch") in the decoded video, as well as low delay. The coder architecture includes a motion compensated predictor (which employs a simulation of the decoder within the encoder) and an adaptive vector quantizer in addition to its dynamic bit allocation capability. Conventional entropy coding techniques are used to further increase the quantity of coded information which may be transmitted with the given number of available bits, thereby further improving the quality of the decoded video.

The input signal to the illustrative coder of FIG. 1 comprises a succession of frames, each of which is apportioned into vectors, also referred to as blocks. Each block may, for example, comprise an eight by eight pixel square (containing 64 picture elements). Each block which is coded may be coded as an "interframe" block, in which the difference between the pixel data of the current block and the pixel data of a (motion compensated) corresponding block from the previous frame is coded. In FIG. 1, conventional subtractor 12 produces this difference. In some cases, where it is advantageous to do so, a block may instead be coded as an "intraframe" block, in which the pixel data of the block is coded directly.

In each case, the block to be coded is first advantageously transformed into the frequency domain by conventional discrete cosine transforms (DCTs) 14 and 16, respectively. In other embodiments, transformations into the frequency domain may be performed with other conventional methods. Transformation of the block data into a plurality of frequency subbands ("subband coding") may also be used. Various approaches to transform coding including the discrete cosine transformation and subband coding of video signals are conventional techniques known to those of ordinary skill in the art.

If a given block is selected for coding, the coding technique (intraframe or interframe) which yields the better coding (i.e., smallest error) is chosen for the given block by conventional intra/inter selector 26. Thus, some blocks in a given frame may be interframe coded and some may be intraframe coded.

At low bit rates, it will likely not be possible to code every block of a given frame. Thus each block of a frame is initially analyzed to determine its "prediction error" based on the corresponding (motion compensated) block from the previous frame. Block store and prioritizer 17 performs this function—each block is input, analyzed, and the resultant (frequency transformed) block data and associated prediction errors are stored. The prediction error of a block is a metric which quantifies the error which would result if the block were not explicitly coded with use of a codebook—that is, the decoder would determine the given block based only on a motion compensated corresponding block from the previous frame.

The blocks of the frame are assembled by block store and prioritizer 17 and ordered by decreasing prediction error.

The blocks are then selected for coding in this order. Thus, since there will likely not be enough bits to code all the blocks, those blocks whose predictions from the previous frame yield relatively superior results will be the blocks which will not be coded.

The metric used for the prediction error may be a simple function of the (frequency transformed) pixel differences in the blocks, such as a mean square error (i.e., the average of the squares of the differences), or it may be a perceptual metric which models the "perceived" error. Such metrics, including perceptual metrics, are conventional and well known to those skilled in the art. For example, if the prediction error metric used is the mean square error, then the prediction error for the k'th block (assuming blocks of size 8 by 8 pixels) is given by $$mse_{P,k} = (1/64)\Sigma(B_k(j) - \hat{B}_k(j))^2$$

where $B_k(j)$ is the j'th pixel in the block, $\hat{B}_k(j)$ is the j'th pixel in the (motion compensated) predicted block, and where the summation is performed over j=1 to 64.

In certain alternative embodiments, it may be advantageous to locate block store and prioritizer 17 before, rather than after, discrete cosine transforms 14 and 16. In this manner, the untransformed block data will be stored, and the prediction error will be based on this untransformed data. Thus, it will only be necessary to compute the discrete cosine transformation on those blocks which will ultimately be chosen for coding. Such an approach may be more efficient because the computation of a discrete cosine transformations is a relatively compute-intensive operation. However, most conventional perceptual metrics are based on frequency domain data. Therefore, when such perceptual metrics are used, the transformed data is used.

The coding of a given block is performed with the use of conventional vector quantization (VQ) codebooks. In particular, two codebooks are used—interframe codebook 24 and intraframe codebook 18. For interframe coding, the frequency transformed difference between the given block and the motion compensated predicted block from the previous frame is coded by conventional interframe vector quantizer (Inter-VQ) 22 with use of the interframe codebook. In other words, a transformation of the prediction error is the particular block data which is coded. For intraframe coding, the given block itself is frequency transformed, and the transformed block is directly coded by conventional intraframe vector quantizer (Intra-VQ) 20 with use of the intraframe codebook.

In both the interframe coding case and the intraframe coding cases, the "best matching" codebook entry to the block data to be coded is identified, and the corresponding codebook index is extracted to be used as a (possible) coding of the given block. That is, the codebook entry which yields the smallest error is selected from each codebook. The coding technique (intraframe or interframe) which yields the smaller of the two resultant errors (and thus provides the better coding) is chosen for the given block by conventional intra/inter elector 26. The resultant coding and the resultant error of that coding are stored in provisional coding store 27. The metric used to determine the error resulting from coding with a given codebook entry may, once again, be a mean square error or another conventional metric such as a perceptual metric.

For example, if the metric used is the mean square error, the interframe codebook vector $V_i$ for coding block k is chosen to minimize the error, $mse_k$, given by $$mse_k = min\{(1/64)\Sigma(V_i(j) - (B_k(j) - \hat{B}_k(j)))^2: V_i \in \text{interframe codebook}\},$$

where the summation is performed over j=1 to 64 and $B_k(j)$ and $\hat{B}_k(j)$ are as defined above. The intraframe codebook vector is similarly chosen to minimize the error, $mse_k$, in this case given by $$mse_k = min\{(1/64)\Sigma(V_i(j) - B_k(j))^2: V_i \in \text{interframe codebook}\},$$

since the given block itself, rather than the prediction error, is the block data which is being coded. These two resulting minimum values are then compared to determine which coding technique (interframe or intraframe) is chosen for the given block, and to determine the resultant coding error.

The overall coding of a given block thus consists of a codebook choice (interframe or intraframe) and an index, i, within that codebook, plus the corresponding motion vector data used in the prediction for that block. Note, however, that if the block is intraframe coded, the motion vector data for that block becomes irrelevant and thus may be discarded. Both the encoding for the block and the resultant coding error are stored in provisional coding store 27.

Block store and prioritizer 17 directs that blocks be coded by interframe vector quantizer 22 and intraframe vector quantizer 20 in decreasing prediction error order, until bit rate analyzer 15 determines that no more blocks may be coded within the fixed number of bits which are available to code the given frame. Bit rate analyzer 15 makes such a determination based on the coded frame data as produced by entropy coders 28, 44 and 48. These entropy coders perform conventional entropy coding on the block data which has been coded (e.g., the codebook indices), the motion vector data produced in the current frame "prediction" process (see discussion below), and any codebook updates which are to be made to the codebooks and thus must be transmitted to the decoder (also see discussion below), respectively. In certain embodiments, two or more of the entropy coders may advantageously be combined to produce a more efficient coding by performing a joint entropy coding on a combination of data, rather than individually coding each of the different types of data. For example, due to the spatial correlation between motion vectors and codebook vectors, a more efficient coding may be obtained by jointly entropy coding the location of both together.

When bit rate analyzer 15 determines that no more blocks may be coded, provisional coding store 27 has thereby stored the encodings (i.e., the selected codebook entry index) for all of the coded blocks. This, together with the associated motion vector encodings, represents the first provisional coding. (Note that the first provisional coding uses the unmodified codebooks.) In addition, for each coded block, the resultant error (i.e., the error which remains after the block has been coded) has been stored in provisional coding store 27. In prior art fixed bit-rate systems, this first provisional coding would be transmitted to the decoder as the adopted coding for the current frame. However, in accordance with the present invention, dynamic bit allocator 52 advantageously considers alternative codings using a modified set of codebooks.

Specifically, dynamic bit allocator 52 attempts to modify the codebooks in such a manner that a re-coding of the current frame will reduce the overall distortion (i.e., the total error) in the reconstructed frame. The total error is the sum of all the prediction errors for the blocks not coded, plus the sum of all the resultant coding errors for the blocks which have been coded. In other words, when the current frame is reconstructed by the decoder based on the motion compensated previous frame data for the blocks not coded and based on the encodings of the blocks which were coded, the total error will measure the resultant distortion (i.e., the error from the actual current frame).

In particular, based on the first provisional coding as stored in provisional coding store 27, codebook updates which would enable the blocks having the largest errors to be re-coded essentially without error are considered in order of decreasing error. Note that a vector can be coded without error if the vector itself is added to the codebook. In actuality, however, it is advantageous to perform a scaler quantization on the coefficients of the vector (i.e., the block) before adding it to the codebook. In this manner, for example, coefficients which are perceptually close to zero need not be entered. Thus, such a codebook update will enable the given block to be coded substantially error-free.

Specifically, the block having the largest error is designated for substantially error-free coding. This block is either the uncoded block having the largest prediction error or the coded block having the largest resultant coding error, whichever error is larger. A substantially error-free coding of the block can be achieved either by the addition of the corresponding predicted block (after scaler quantization) to the interframe codebook or by the addition of the block itself (after scaler quantization) to the intraframe codebook. The decision as to which codebook to update may be made, for example, based on which codebook update can be most efficiently coded for transmission to the decoder.

In order to obtain coding bits to compensate for those which will be used by the codebook update, the coding of some of the previously coded blocks are discarded from the first provisional coding by dynamic bit allocator 52 to produce the "second provisional coding." In particular, the encoding of these blocks are "removed" from the first provisional coding (as stored in provisional coding store 27) in increasing order of their "coding error improvement." The coding error improvement, $\Delta mse_k$, of a coded block, k, is the amount by which the error has been reduced as a result of the coding of that block, namely, $\Delta mse_k = mse_{P,k} - mse_k$. That is, the improvement as a result of the coding is the difference between the prediction error, which would be the resultant error in the absence of coding, and the resultant coding error. Thus, the blocks whose coding resulted in the least gain will be eliminated from the first provisional coding to make room for the codebook update in the second provisional coding.

As each coded block is eliminated from the coding, entropy coder 28 regenerates the coding of the block data and bit rate analyzer 15, in turn, determines whether the new coding, which includes the coding of one or more codebook updates, fits within the available number of bits. Dynamic bit allocator 52 continues to direct provisional coding store 27 to eliminate coded blocks one at a time, in increasing coding error improvement order, until the new coding fits within the available number of bits. That is, the process iterates until the number of coding bits saved by the removal of the coded blocks equals or exceeds the number of bits required to code the codebook update. When this has occurred, a "plausible" coding, that is, one that can be transmitted with the available number of bits, has been produced. This coding is the second provisional coding.

At this point, the total error of the second provisional coding is compared with the total error of the first provisional coding to determine which coding is better (i.e., which has a smaller total error). Equivalently, the sum of all coding error improvements, $\Delta mse_k$, for all blocks, k, which have been eliminated from the coding, is compared to the error of the designated block which had the largest error (resultant error if it had been coded or prediction error if it had not been coded).

If the first provisional coding proves to be better (i.e., has a lower total error) than the second provisional coding, the codebooks are not updated and the first provisional coding is adopted as the coding for the given frame. The first provisional coding may thus be transmitted to the decoder or stored, depending on the application. If, on the other hand, the second provisional coding proves to be the better coding, dynamic bit allocator 52 instructs codebook update 56 to make the update in the appropriate (interframe or intraframe) codebook as described above. The new vector may be inserted into the codebook either at an unused location or by replacing (i.e., first deleting) an existing entry.

In the case where an existing codebook entry is replaced, a number of techniques may be used to select the entry to be deleted. For example, a "least recently used" approach may be used, a metric which determines the "value" of a given codebook entry may be used, or a combination of these two approaches may be used. The "value" of a codebook entry may be represented by a quantitative measure such as, for example, a running total of the coding error improvements achieved by the given entry.

One such illustrative combination approach involves maintaining both a "usage count" and a time-weighted average coding error improvement metric for each codebook entry. The usage count may be bounded by a minimum and a maximum value, where the count is, for example, set to the maximum value when the vector is inserted in the codebook, incremented for each frame in which the vector is used, and decremented for each frame in which the vector is not used. The time-weighted average coding error improvement metric quantifies the degree to which the use of a given codebook entry has provided significant improvement to blocks of recent frames. For example, the coding error improvement, $\Delta mse_{Avg,j}$, of a codebook vector, j, may be calculated as follows $$\Delta mse_{Avg,j}(n) = .5(\Delta mse_{Avg,j}(n-1) + \Delta mse_j(n)),$$

where the current frame is frame n. Illustratively, the codebook entry which is replaced by an update is the one having the smallest product of usage count times $\Delta mse_{Avg,j}$.

Regardless of the codebook replacement technique used, it is advantageous to ensure that none of the entries which have been used in the coding of the current frame are deleted, since doing so could adversely effect the coding analysis of dynamic bit allocator 52. In other alternative embodiments, the codebooks can be "redesigned" (i.e., re-built from scratch rather than updated) using some or all of the current and previous block data, or a combination of the codebook updating and codebook redesigning approaches may be used.

If the second provisional coding is determined to be the better coding, it is possible that further codebook updates might improve the coding even further. Thus, in this case, the second provisional coding becomes the first provisional coding, and the above described process iterates. Specifically, dynamic bit allocator 52 again designates the block having the largest error for error-free coding, but now, it is, of course, a different block, since the block designated in the previous iteration has now been coded error-free. The process described above is repeated (with the second provisional coding of each iteration becoming the first provisional coding of the next iteration) until the newly created second provisional coding results in an increase in the total error when compared to the first provisional coding of the given iteration. This occurs when the addition of another codebook vector will reduce the total error for the frame by a smaller amount than the error which would be added as a result of the elimination of the coding of blocks to the extent necessary to allow for the coding of the codebook update.

Once the above-described iterative procedure terminates, the (current) first provisional coding may be adopted as the coding of the current frame. However, the illustrative system of FIG. 1 advantageously performs a "final" re-coding, so that any incidental gains from the codebook updates may be realized. For example, one or more of the added codebook entries may result in an improved coding of blocks other than the designated block for which it was added. Note that by performing a re-coding with the updated codebook, it is not possible that the total error will increase, since none of the codebook entries previously used in the coding of the current frame have been deleted. In other, alternative embodiments, one or more re-iterations of the above procedure may be performed again after the "final" re-coding to determine if even further codebook updates might be advantageous.

As discussed above, it is advantageous to incorporate the decoder circuitry within the encoder to reproduce the previous frame, from which the "prediction" for the current frame will be generated. Specifically, in the system of FIG. 1, inverse vector quantizer (IVQ) 30 retrieves the codebook entry from the appropriate codebook (interframe codebook 24 or intraframe codebook 18) based on how the given block was coded (as determined by intra/inter elector 26). Then, inverse discrete cosine transform (IDCT) 32 restores the pixel data by performing an inverse discrete cosine transformation. If the block was interframe coded, adder 34 combines the motion compensated corresponding block from the previous frame to the decoded (and inverse frequency transformed) current frame block, and stores the result into frame delay memory 38. Thus, the given reconstructed frame block is available for use both in the coding (through subtractor 12) and the decoding (through adder 34) of the subsequent frame. If the given block was intraframe coded (as determined by inter/intra selector 36), the inverse transformed block is directly stored into frame delay memory 38. Inverse vector quantizer 30, inverse discrete cosine transform 32, adder 34, inter/intra selector 36 and frame delay memory 38 are all of conventional design.

The system of FIG. 1 also incorporates motion compensation for use in interframe coding (i.e., prediction). Specifically, the given current frame block is compared to a plurality of displaced versions of a corresponding block from the previous frame by motion estimator 42. In addition, the current frame block is stored in frame delay memory 40 for use in motion estimation for the next frame. The displacement which yields the smallest prediction error is selected by motion estimator 42 and is provided to motion compensator 46 for feedback to subtractor 12 for coding and to adder 34 for decoding. In this manner, the "motion vector" (i.e., the "optimum" displacement) is advantageously determined based on the actual frame data in the successive flames, while the coding of the current frame is based on the reconstructed (i.e., decoded) version of the previous frame as discussed above. The motion compensation provided may be limited to vertical and horizontal translational motion (as is common) or may advantageously include rotational motion as well. The use of rotational motion compensation for use in video coding has been described, for example, in V. Seferidis and M. Ghanbari, *General Approach to Block-matching Motion Estimation*, Optical Engineering, Vol. 32 No. 7, Jul. 1993. Motion estimator 42, frame delay memory 40 and motion compensator 46 are all of conventional design.

FIG. 2 shows a flow diagram of the method described above in connection with the illustrative embodiment of FIG. 1. Initially, step 58 generates and stores (in block store and prioritizer 17) the frequency transformed predicted block difference data for each block in the current frame. As described above, the predicted blocks are determined based on a motion compensated reconstruction of the previous frame. Step 60 computes and stores (also in block store and prioritizer 17) corresponding prediction errors for each predicted block. Steps 58 and 60 may be advantageously combined (e.g., performed concurrently).

After all current frame blocks have been analyzed and stored by steps 58 and 60, step 62 selects the (as yet uncoded) block having the highest prediction error. This block is then coded both with the interframe coding technique using interframe codebook 24 (step 64) and with the intraframe coding technique using intraframe codebook 18 (step 66). Each of steps 64 and 66 also compute the corresponding resultant coding error. Step 68 compares the two resultant coding errors and selects the coding which produced the lower error for inclusion in what will become the "first provisional coding." Step 70 saves this coding (along with the previously coded blocks) in provisional coding store 27 as part of the first provisional coding. Step 72 then performs entropy coding of the blocks thus far coded, enabling bit rate analyzer 15 to determine the total number of bits used thus far in coding the current frame. If bit rate analyzer 15 determines that more bits are available to code more blocks (decision 74), control returns to block store and prioritizer 17 and to step 62 to select another as yet uncoded block for coding.

When decision 74 determines that no more bits are available, the first provisional coding is complete. Control then passes to dynamic bit allocator 52. Step 76 designates the coded block with the highest resultant coding error or the uncoded block with the highest prediction error, whichever is larger, for error-free coding. In other words, the designated block is the one which will result in the largest reconstruction error as a result of decoding the first provisional coding. This "worst" block will be provisionally used as the basis of a codebook update, thereby achieving the best possible improvement to the first provisional coding, before taking into account the bits required to transmit the codebook update. Codebook updates which will enable an error-free coding of the designated block are then devised and codings thereof are generated, both for the interframe codebook (step 78) and for the intraframe codebook (step 80). Of the two codebook update codings generated, the one which uses the fewest number of bits (i.e, the "cheapest" to code) is chosen to be included in the "second provisional coding" (step 82).

Once the provisional codebook update has been chosen, the coded block in the first provisional coding which provided the smallest coding error improvement is selected (step 84) and eliminated (step 86) from the second provisional coding. Then, step 88 performs a new entropy coding to determine the number of bits used by the second provisional coding. Bit rate analyzer 15 determines if the second provisional coding uses more than the fixed number of bits available for coding the given frame (decision 90), and, if so, returns to step 84 to eliminate another coded block from the second provisional coding. Note that the number of bits required to code all codebook updates included in the second provisional coding must be included in this computation, since the coding of the current frame necessarily includes the coding of any associated codebook updates.

Once decision 90 determines that enough coded blocks have been eliminated so that the second provisional coding uses no more than the available number of bits, decision 92 determines whether the sum of the coding error improvements for the eliminated blocks is less than the designated block's original resultant coding error (if it was a coded block) or prediction error (is it was an uncoded block). Stated equivalently, it determines if the first provisional coding has a smaller total error than the second provisional coding, and thus, which is the better coding. If the second provisional coding is determined to be the better coding, it may be possible that additional codebook updates can further improve the coding. Thus, the second provisional coding becomes the first provisional coding and dynamic bit allocator 52 repeats the above analysis. That is, control returns to step 76, where yet another block will be designated for use in generating a further codebook update.

Once decision 92 determines that the first provisional coding is the better coding, step 94 updates the codebooks with any codebook updates which have been included in what is now the first provisional coding. Then, based on these modified codebooks, a final regeneration of a coding for the current frame is performed in step 96, so that any incidental benefits of the codebook updates may be fully realized. In particular, steps 62–74 are performed again. This time, however, decision 74 must take into account the bits required to code any codebook updates which have been made. When decision 74 determines that there are no more bits available, control returns to step 98. Finally, depending on the particular application, step 98 transmits the final coding generated by step 96 to the decoder for decoding or stores the final coding of the current frame for later use.

Although the illustrative embodiments described above pertain to the coding of video signals, the method of the present invention is not so limited. The techniques described herein may also be applied to the coding of audio signals including speech signals as well as to the coding of still images. In the case of audio signals, for example, the frames which comprise the signal to be coded are "one-dimensional" signals (i.e., single-valued signals which change over a predetermined period of time), rather than the two-dimensional image signals described above. Moreover, in the audio and speech coding cases, the "portions" of the frame which are individually coded are commonly referred to as "subframes" rather than "blocks."

For clarity of explanation, the illustrative embodiment of the present invention is presented as comprising individual functional blocks (including functional blocks labeled as "processors"). The functions these blocks represent may be provided through the use of either shared or dedicated hardware, including, but not limited to, hardware capable of executing software. For example, the functions of processors presented in FIG. 1 may be provided by a single shared processor. (Use of the term "processor" should not be construed to refer exclusively to hardware capable of executing software.)

Illustrative embodiments may comprise digital signal processor (DSP) hardware, such as the AT&T DSP16 or DSP32C, read-only memory (ROM) for storing software performing the operations discussed below, and random access memory (RAM) for storing DSP results. Very large scale integration (VLSI) hardware embodiments, as well as custom VLSI circuitry in combination with a general purpose DSP circuit, may also be provided.

Although a number of specific embodiments of this invention have been shown and described herein, it is to be understood that these embodiments are merely illustrative of the many possible specific arrangements which can be devised in application of the principles of the invention. Numerous and varied other arrangements can be devised in accordance with these principles by those of ordinary skill in the art without departing from the spirit and scope of the invention.

I claim:

1. A method of coding a signal with use of a vector quantization codebook, the codebook comprising a plurality of vectors, the signal comprising a succession of frames, each of the frames comprising one or more frame portions, the method comprising the steps of:

determining a first provisional coding of a given one or more of said frames wherein each of one or more of the portions of the given one or more of said frames are coded with use of the codebook, the first provisional coding using at most a fixed, predetermined number of bits;

generating a modified codebook by replacing one or more of said vectors in said codebook with one or more substitute vectors;

determining a second provisional coding of the given one or more of said frames, wherein
   (i) the one or more substitute vectors which replaced the one or more of said vectors in said codebook are coded, and
   (ii) each of one or more of the portions of the given one or more frames are coded with use of the modified codebook, the second provisional coding using at most the fixed, predetermined number of bits;

determining a first coding error associated with the first provisional coding and a second coding error associated with the second provisional coding; and selecting the provisional coding having the smaller associated coding error as the coding of the given one or more frames.

2. The method of claim 1 further comprising the step of replacing the codebook with the modified codebook when the first coding error is greater than the second coding error.

3. The method of claim 1 wherein each of the substitute vectors comprises one of the frame portions.

4. The method of claim 1 wherein each of the substitute vectors comprises a transformation of one of the frame portions into a frequency domain.

5. The method of claim 1 wherein each of the substitute vectors comprises a transformation into a frequency domain of a difference between one of the frame portions of one of said one or more frames and a corresponding portion of a previous one of said one or more frames.

6. The method of claim 1 wherein each of the substitute vectors comprises a transformation into a frequency domain of a difference between one of the frame portions of one of said one or more frames and a corresponding motion compensated portion of a previous one of said one or more frames.

7. The method of claim 1 wherein the coding of the frame portions comprises quantizing the frame portions by performing a subband decomposition of said frame portions.

8. The method of claim 1 wherein the coding of the frame portions comprises quantizing differences between the frame portions of one of said one or more frames and corresponding portions of a previous one of said one or more frames by performing a subband decomposition of said differences.

9. The method of claim 1 wherein the coding of the frame portions comprises quantizing differences between the frame portions of one of said one or more flames and corresponding motion compensated portions of a previous one of said one or more flames by performing a subband decomposition of said differences.

10. The method of claim 1 wherein the coding of the frame portions comprises quantizing the frame portions by performing a transformation of said frame portions into a frequency domain.

11. The method of claim 10 wherein the transformation of said frame portions comprises a discrete cosine transformation.

12. The method of claim 1 wherein the coding of the frame portions comprises quantizing differences between the frame portions of one of said one or more frames and corresponding portions of a previous one of said one or more frames by performing a transformation of said differences into a frequency domain.

13. The method of claim 12 wherein the transformation of said differences comprises a discrete cosine transformation.

14. The method of claim 1 wherein the coding of the frame portions comprises quantizing differences between the frame portions of one of said one or more frames and corresponding motion compensated portions of a previous one of said one or more frames by performing a transformation of said differences into a frequency domain.

15. The method of claim 14 wherein the transformation of said differences comprises a discrete cosine transformation.

16. An apparatus for coding a signal with use of a vector quantization codebook, the codebook comprising a plurality of vectors, the signal comprising a succession of frames, each of the frames comprising one or more frame portions, the apparatus comprising:

means for determining a first provisional coding of a given one or more of said frames wherein each of one or more of the portions of the given one or more of said frames are coded with use of the codebook, the first provisional coding using at most a fixed, predetermined number of bits;

means for generating a modified codebook by replacing one or more of said vectors in said codebook with one or more substitute vectors;

means for determining a second provisional coding of the given one or more of said frames, wherein (i) the one or more substitute vectors which replaced the one or more of said vectors in said codebook are coded, and (ii) each of one or more of the portions of the given one or more frames are coded with use of the modified codebook, the second provisional coding using at most the fixed, predetermined number of bits;

means for determining a first coding error associated with the first provisional coding and a second coding error associated with the second provisional coding; and means for selecting the provisional coding having the smaller associated coding error as the coding of the given one or more frames.

17. The apparatus of claim 16 further comprising means for replacing the codebook with the modified codebook when the first coding error is greater than the second coding error.

18. The apparatus of claim 16 further comprising means for generating the one or more substitute vectors, wherein each of the substitute vectors comprises one of the frame portions.

19. The apparatus of claim 16 further comprising means for generating the one or more substitute vectors, wherein each of the substitute vectors comprises a transformation of one of the frame portions into a frequency domain.

20. The apparatus of claim 16 further comprising means for generating the one or more substitute vectors, wherein each of the substitute vectors comprises a transformation into a frequency domain of a difference between one of the frame portions of one of said one or more frames and a corresponding portion of a previous one of said one or more frames.

21. The apparatus of claim 16 further comprising means for generating the one or more substitute vectors, wherein each of the substitute vectors comprises a transformation into a frequency domain of a difference between one of the frame portions of one of said one or more frames and a corresponding motion compensated portion of a previous one of said one or more frames.

22. The apparatus of claim 16 further comprising means for quantizing the frame portions by performing a subband decomposition of said frame portions.

23. The apparatus of claim 16 further comprising means for quantizing differences between the frame portions of one of said one or more frames and corresponding portions of a previous one of said one or more frames by performing a subband decomposition of said differences.

24. The apparatus of claim 16 further comprising means for quantizing differences between the frame portions of one of said one or more frames and corresponding motion compensated portions of a previous one of said one or more frames by performing a subband decomposition of said differences.

25. The apparatus of claim 16 further comprising means for performing a transformation of said frame portions into a frequency domain.

26. The apparatus of claim 25 wherein said transformation comprises a discrete cosine transformation.

27. The apparatus of claim 16 further comprising means for quantizing differences between the frame portions of one of said one or more frames and corresponding portions of a previous one of said one or more frames by performing a transformation of said differences into a frequency domain.

28. The apparatus of claim 27 wherein the transformation of said differences comprises a discrete cosine transformation.

29. The apparatus of claim 16 further comprising means for quantizing differences between the frame portions of one of said one or more frames and corresponding motion compensated portions of a previous one of said one or more frames by performing a transformation of said differences into a frequency domain.

30. The apparatus of claim 25 wherein the transformation of said differences comprises a discrete cosine transformation.

31. A video teleconferencing system comprising:

a video camera for generating a video input signal;

means for coding the video input signal with use of a vector quantization codebook, the codebook comprising a plurality of vectors, the video input signal comprising a succession of frames, each of the frames comprising one or more frame portions, the coding means comprising means for determining a first provisional coding of a given one or more of said frames wherein each of one or more of the portions of the given one or more of said frames are coded with use of the codebook, the first provisional coding using at most a fixed, predetermined number of bits, means for generating a modified codebook by replacing one or more of said vectors in said codebook with one or more substitute vectors, means for determining a second provisional coding of the given one or more of said frames, wherein (i) the one or more substitute vectors which replaced the one or more of said vectors in said codebook are coded, and (ii) each of one or more of the portions of the given one or more frames are coded with use of the modified codebook, the second provisional coding using at most the fixed, predetermined number of bits, means for determining a first coding error associated with the first provisional coding and a second coding error associated with the second provisional coding, and means for selecting the provisional coding having the smaller associated coding error as the coding of the given one or more frames; and means for transmitting the coded video input signal to a video receiver.

32. The video teleconferencing system in accordance with claim 31 further comprising:

means for receiving a received coded video signal;

means for decoding the received coded video signal to generate a decoded video signal; and a video display for displaying the decoded video signal.

33. A video telephone comprising:

video camera means for generating a video input signal;

means for coding the video input signal with use of a vector quantization codebook, the codebook comprising a plurality of vectors, the video input signal comprising a succession of frames, each of the frames comprising one or more frame portions, the coding means comprising means for determining a first provisional coding of a given one or more of said frames wherein each of one or more of the portions of the given one or more of said frames are coded with use of the codebook, the first provisional coding using at most a fixed, predetermined number of bits, means for generating a modified codebook by replacing one or more of said vectors in said codebook with one or more substitute vectors, means for determining a second provisional coding of the given one or more of said frames, wherein (i) the one or more substitute vectors which replaced the one or more of said vectors in said codebook are coded, and (ii) each of one or more of the portions of the given one or more frames are coded with use of the modified codebook, the second provisional coding using at most the fixed, predetermined number of bits, means for determining a first coding error associated with the first provisional coding and a second coding error associated with the second provisional coding, and means for selecting the provisional coding having the smaller associated coding error as the coding of the given one or more frames; and means for transmitting the coded video input signal across a telecommunications network.

34. The video telephone in accordance with claim 33 further comprising:

means for receiving a received coded video signal;

means for decoding the received coded video signal to generate a decoded video signal; and a video display for displaying the decoded video signal.

* * * * *